United States Patent [19]
Müller et al.

[11] Patent Number: 5,173,559
[45] Date of Patent: Dec. 22, 1992

[54] REACTIVE SYSTEMS AND A PROCESS FOR THE PREPARATION OF POLYURETHANE PLASTICS

[75] Inventors: Hanns-Peter Müller, Bergisch-Gladbach; Otto Ganster, Odenthal-Hahnenberg; Bruno Luckas, Leverkusen, all of Fed. Rep. of Germany

[73] Assignee: Bayer Aktiengesellschaft, Leverkusen, Fed. Rep. of Germany

[21] Appl. No.: 429,264

[22] Filed: Oct. 20, 1989

[30] Foreign Application Priority Data

Oct. 27, 1988 [DE] Fed. Rep. of Germany ....... 3836598

[51] Int. Cl.$^5$ ............................................. C08G 18/00
[52] U.S. Cl. ...................................... 528/44; 528/52; 528/53; 528/59; 528/65; 521/99; 521/117; 521/119; 521/120; 521/128
[58] Field of Search ...................... 528/44, 60, 48, 49, 528/51, 53, 59, 52, 65; 521/124, 137, 104, 107, 108, 121, 128, 99, 117; 428/35.7

[56] References Cited

U.S. PATENT DOCUMENTS

| | | | |
|---|---|---|---|
| 4,182,826 | 1/1980 | Ludke | 528/57 |
| 4,542,165 | 9/1985 | Kumata et al. | 521/137 |
| 4,614,786 | 9/1986 | Goel et al. | 528/60 |
| 4,728,676 | 3/1988 | Muller et al. | 521/107 |
| 4,766,158 | 8/1988 | Fuzesi et al. | 521/110 |
| 4,788,224 | 11/1988 | Müller et al. | 521/104 |
| 4,988,549 | 1/1991 | Meyer et al. | 428/35.7 |

FOREIGN PATENT DOCUMENTS 1247619 9/1971 United Kingdom .

*Primary Examiner*—John Kight, III
*Assistant Examiner*—Duc Truong
*Attorney, Agent, or Firm*—Joseph C. Gil; Richard E. L. Henderson

[57] ABSTRACT

The present invention relates to reactive systems comprising
(a) a storable mixture of (i) a polyisocyanate component comprising at least one organic polyisocyanate, and (ii) an epoxide component stabilized by heating in the presence of an alkylating agent, wherein said heating is optionally carried out in the further presence of part of the polyisocyanate component (i),
(b) an isocyanate-reactive component containing at least two isocyanate-reactive groups in a quantity such that 0.1 to 0.9 isocyanate-reactive groups are present for every isocyanate group in component (a), wherein at least 10% by weight of component (b) comprises compounds having a molecular weight greater than about 2000,
(c) optionally, tertiary amines in a quantity such that the total storable mixture contains at least 0.005 mole of tertiary amine nitrogen atoms for each 100 g of the total amount of the storable mixture, and, optionally,
(d) other auxiliaries and additives.

The present invention also relates to a process for the preparation of optionally foamed polyurethane plastics containing isocyanurate groups comprising (1) mixing the components of such reactive systems at a temperature less than 60° C. and (2) heating said reactive system to a temperature of at least 60° C.

11 Claims, No Drawings

REACTIVE SYSTEMS AND A PROCESS FOR THE PREPARATION OF POLYURETHANE PLASTICS

BACKGROUND OF THE INVENTION

This invention relates to novel reactive systems consisting of a special polyisocyanate component and a reactive component for this polyisocyanate component and of auxiliaries and additives. This invention further relates to a process for the preparation of polyurethane plastics containing isocyanurate groups using these reactive systems.

The preparation of plastics containing isocyanurate groups has long been known and in various forms is carried out on an industrial scale. For example, German Offenlegungsschrift 2,534,247 describes a process for the preparation of moldings based on isocyanurate-modified polyurethanes using strongly basic compounds, such as alkali acetates or alkali phenolates, as trimerization catalysts. Hardening times of 0.75 to 2 minutes can be obtained with these catalysts. This process, however, cannot be used for longer hardening times (that is, for the longer pot lives of the reaction mixtures which are often required in practice) because the basic catalysts must then be used in very small quantities. Consequently, acidic impurities, which can be present in the starting materials or additives, can have a completely uncontrollable effect on the time taken by the hardening reaction by neutralizing the catalyst. Reproducible processing of the starting materials is then no longer possible.

Although the Mannich bases recommended as trimerization catalysts, for example, in German Offenlegungsschrift 1,809,391 provide for longer pot lives, such compounds suffer the disadvantage of very slow and often incomplete final hardening, resulting in poorer thermal properties of the resulting plastics.

The object of the present invention is to provide new reactive systems which react to form high-quality polyurethanes containing isocyanurate groups but which are not attended by the disadvantages of previously known systems. The desired reactive systems should have a sufficiently long pot life for practical requirements at room temperature or only moderately elevated temperature, coupled with short hardening times at elevated temperatures. This object is achieved by the reactive systems of the invention, which are described in detail hereinafter, when used in the process of the invention for preparing isocyanurate-modified polyurethane plastics.

SUMMARY OF THE INVENTION

The present invention relates to reactive systems comprising
(a) a storable mixture of
  (i) a polyisocyanate component comprising at least one organic polyisocyanate, and
  (ii) an epoxide component comprising at least one organic epoxide, wherein said epoxide component is stabilized by heating in the presence of an alkylating agent, and wherein said heating is optionally carried out in the further presence of at least part of the polyisocyanate component (i) using quantities of components (i) and (ii) such that 0.005 to 0.15 mole of epoxide groups are present in 100 parts by weight of component (a),
(b) an isocyanate-reactive component comprising at least one organic compound containing at least two isocyanate-reactive groups in a quantity such that 0.1 to 0.9 isocyanate-reactive groups are present for every isocyanate group in component (a), wherein at least 10% by weight of component (b) comprises compounds having a molecular weight greater than about 2000,
(c) optionally, tertiary amines in a quantity such that the storable mixture contains at least 0.005 mole of tertiary amine nitrogen atoms (including any tertiary amine nitrogen atoms present in component (b)) for each 100 g of the total amount of the storable mixture, and, optionally,
(d) other auxiliaries and additives.

The present invention also relates to a process for the preparation of optionally foamed polyurethane plastics containing isocyanurate groups comprising
(1) preparing a reactive system by mixing, optionally in molds, at a temperature less than about 60° C. (preferably less than 40° C.),
  (a) a storable mixture of
    (i) a polyisocyanate component comprising at least one organic polyisocyanate, and
    (ii) an epoxide component comprising at least one organic epoxide, wherein said epoxide component is stabilized by heating in the presence of an alkylating agent, and wherein said heating is optionally carried out in the presence of at least part of the polyisocyanate component (i) in quantities of components (i) and (ii) such that 0.005 to 0.15 mole of epoxide groups are present in 100 parts by weight of component (a),
  (b) an isocyanate-reactive component comprising at least one organic compound containing at least two isocyanate-reactive groups in a quantity such that 0.1 to 0.9 isocyanate-reactive groups are present for every isocyanate group in component (a), wherein at least 10% by weight of component (b) comprises compounds having a molecular weight greater than about 2000,
  (c) optionally, tertiary amines in a quantity such that the storable mixture contains at least 0.005 mole of tertiary amine nitrogen atoms (including any tertiary amine nitrogen atoms present in component (b)) for each 100 g of the total amount of the storable mixture, and, optionally,
  (d) other auxiliaries and additives; and
(2) heating said reactive system to a temperature of at least 60° C. by applying heat and/or by using the heat of the polyurethane-forming reaction.

DETAILED OF THE INVENTION

Component (a) of the reactive systems of the invention comprises mixtures of (i) a polyisocyanate component and (ii) an epoxide component in which the epoxide component is stabilized by heat treatment in the presence of an alkylating agent. The stabilizing heat treatment largely suppresses any reaction between the isocyanate groups and the epoxide groups, for example, as described in U.S. Pat. No. 4,766,158.

The polyisocyanate component (i) comprises at least one organic polyisocyanate of the type known from polyurethane chemistry, such as, for example, hexamethylene diisocyanate, the isomeric xylylene diisocyanates, 4,4'-diisocyanatodicyclohexylmethane, 2,4- and/or 2,6-diisocyanatotoluene, and 4,4'-diisocyanatodiphenylmethane and mixtures thereof with 2,4'-diisocyanatodiphenylmethane and, optionally, small quantities of 2,2'-diisocyanatodiphenylmethane and/or higher homologs thereof. It is known that mixtures of this type are formed in the known phosgenation of aniline-formaldehyde condensates. Urethane-, carbodiimide-, uretdione-, isocyanurate-, and/or biuret-modified derivatives of these polyisocyanates may also be used. The polyisocyanate component (i) preferably consists of at least one aromatic polyisocyanate. Polyisocyanates or polyisocyanate mixtures of the diphenylmethane series that are liquid at room temperature or liquid derivatives of these polyisocyanates or polyisocyanate mixtures are particularly suitable. The polyisocyanate component (i) generally has an NCO content of from about 15 to 50% by weight (preferably from 22 to 32% by weight).

The epoxide component (ii) comprises at least one organic epoxide (that is, an organic compound containing epoxide groups) preferably containing 1 to 4 (more preferably 1 to 2) epoxide groups per molecule and having an epoxide equivalent weight of about 70 to about 500 (preferably from 170 to 220). Suitable organic epoxides include monoepoxides or polyepoxides of higher functionality. Examples of suitable monoepoxides include phenoxypropylene oxide, styrene oxide, and glycidyl alcohol. Examples of suitable polyepoxides of higher functionality include polyglycidyl ethers of polyhydric phenols, particularly bisphenol A; polyepoxide compounds based on aromatic amines, particularly N,N-bis(epoxypropyl)aniline, N,N'-dimethyl-N,N'-bis(epoxypropyl)-4,4'-diaminodiphenylmethane, and N,N-bis(epoxypropyl)-4-aminophenyl glycidyl ether; polyglycidyl esters of cycloaliphatic dicarboxylic acids, more especially hexahydrophthalic acid diglycidyl ester; and polyepoxides of the reaction product of n moles of hexahydrophthalic anhydride and 1 mole of a polyol containing n hydroxyl groups (wherein n is an integer of from about 2 to 6), preferably 3 moles of hexahydrophthalic anhydride and 1 mole of 1,1,1-trimethylolpropane.

The epoxides (ii) are present in the components (a) of the invention in inhibited (i.e., stabilized) form insofar as their reactivity with isocyanate groups is concerned. The epoxides are stabilized by heat treatment at about 30 to about 150° C. (preferably at 80° to 130° C.) in the presence of an alkylating agent, which is generally used in a quantity of from about 0.005 to about 1% by weight (preferably in a quantity of from 0.05 to 0.25% by weight), based on the weight of the epoxide. The heat treatment generally lasts about 15 to 60 minutes and may be carried out in the absence of or in the presence of at least part of the polyisocyanate component (i). Thus, the addition of the alkylating agent, as well as the subsequent heat treatment, may take place before the epoxide is combined with the polyisocyanate or after the epoxide has been mixed with at least part of the polyisocyanate.

Suitable alkylating agents include methyl iodide, dimethyl sulfate, or, preferably, sulfonic acid alkyl esters having a molecular weight in the range from about 110 to about 250 and containing 1 to about 4 carbon atoms in the alkyl group. Suitable sulfonic acid alkyl esters include both aliphatic sulfonic acid alkyl esters and aromatic sulfonic acid alkyl esters. Suitable aliphatic sulfonic acid alkyl esters include butanesulfonic acid methyl ester, perfluorobutanesulfonic acid methyl ester, and hexanesulfonic acid ethyl ester. Suitable aromatic sulfonic acid alkyl esters include benzenesulfonic acid methyl ester, ethyl ester, or butyl ester, p-toluenesulfonic acid methyl ester, ethyl ester, or butyl ester, 1-naphthalenesulfonic acid methyl ester, 3-nitrobenzenesulfonic acid methyl ester, and 2-naphthalenesulfonic acid methyl ester. The aromatic sulfonic acid esters are preferred. p-Toluenesulfonic acid methyl ester is particularly preferred.

The quantity of epoxides (ii) present in component (a) is such that about 0.005 to about 0.15 (preferably 0.01 to 0.05 mole) of epoxide groups are present for every 100 g of component (a).

Component (b) of the reactive systems of the invention comprises at least one organic compound having a molecular weight in the range from about 62 to about 12,000 (preferably in the range from 62 to 6,000) and containing from 2 to about 8 (preferably from 2 to 4) isocyanate-reactive groups. Preferred isocyanate-reactive groups include aromatic primary amino or hydroxyl groups and, more preferably, aliphatic hydroxyl groups, with the proviso that at least 10% by weight of component (b) comprises such compounds having a molecular weight above 2,000, the molecular weight being calculable from the functionality and the content of isocyanate-reactive groups.

Component (b) may consist entirely or partly of low molecular weight polyhydroxy compounds (molecular weight in the range from 62 to 400) or relatively high molecular weight polyhydroxyl compounds (molecular weight in the range from 400 to 12,000, preferably in the range from 400 to 6,000) having a hydroxyl functionality of from 2 to about 8 (preferably from 2 to 4). Examples of suitable low molecular weight polyhydroxy compounds (also referred to as polyhydric alcohols) include ethylene glycol, diethylene glycol, 1,4-dihydroxybutane, 1,6-dihydroxyhexane, trimethylolpropane, glycerol, pentaerythritol, sorbitol, or sucrose. Examples of suitable relatively high molecular weight polyhydroxyl compounds include polyhydroxypolyethers of the type known from polyurethane chemistry that can be obtained by alkoxylation of suitable starter molecules (such as the polyhydric alcohols mentioned above, ammonia, amines such as ethylenediamine, hexamethylenediamine, 2,4-diaminotoluene, or aniline, or aminoalcohols such as ethanolamine) using propylene oxide and/or ethylene oxide, wherein these alkylene oxides are added in any order, using any of several methods in the art. Also suitable are polyester polyols of the type obtainable by reaction of the low molecular weight alcohols mentioned above with polybasic carboxylic acids, such as adipic acid, phthalic acid, hexahydrophthalic acid, and tetrahydrophthalic acid, or with the anhydrides of these acids using known methods.

Relatively high molecular weight polyhydroxypolyethers, in which high molecular weight polyadducts or polycondensates or polymers are present in finely dispersed, dissolved, or grafted form, are also suitable. Suitable such modified polyhydroxyl compounds can be obtained, for example, by allowing polyaddition reactions (for example, reactions between polyisocyanates and aminofunctional compounds) or polycondensation reactions (for example, between formaldehyde and phenols and/or amines) to take place in situ in the compounds containing hydroxyl groups. Processes such as these are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. However, as described in U.S. Pat. No. 3,869,413 or German Offenlegungsschrift 2,550,860, it is also possible to mix a prepared aqueous polymer dispersion with a polyhydroxyl compound and then to remove the water from the mixture.

Also suitable as component (b) of the invention are polyhydroxyl compounds modified by vinyl polymers, of the type obtained, for example, by polymerization of styrene and acrylonitrile in the presence of polyethers (U.S. Pat. Nos. 3,383,351, 3,304,273, 3,523,093, and 3,110,695 and German Auslegeschrift 1,152,536) or polycarbonate polyols (German Patentschrift 1,769,795 and U.S. Pat. No. 3,637,909). Particularly flame-resistant plastics are obtained when using polyether polyols that have been modified in accordance with German Offenlegungsschrift 2,442,101, 2,644,922, and 2,646,141 by graft polymerization with vinyl phosphonic acid esters and, optionally, (meth)acrylonitrile, (meth)acrylamide, or OH-functional (meth)acrylates.

Representatives of the above-mentioned compounds suitable for use as compounds (b) in accordance with the invention are described, for example, in *High Polymers*, Vol. XVI, "Polyurethanes, Chemistry and Technology", edited by Saunders and Frisch, Interscience Publishers, New York/London, Vol. I (1962), pages 32–42 and 44–54, and Vol. II (1964), pages 5–6 and 198–199; and in Kunststoff-Handbuch, Vol. VII, Vieweg-Höchtlen, Carl-Hanser-Verlag, Munchen, 1966, for example, on pages 45–71.

Component (b) may also consist entirely or partly of polyether polyamines containing terminal aromatic primary amino groups of the type obtainable, for example, by the processes described in European Patent Application 79,536, German Offenlegungsschriften 2,948,419, 2,019,432, and 2,619,840, and U.S. Pat. Nos. 3,808,250, 3,975,426, and 4,016,143.

Component (b) may also contain low molecular weight aromatic diamines as components of mixtures that satisfy the requirements discussed above. Preferred aromatic diamines include 1,4-diaminobenzene, 2,4-diaminotoluene, 2,4'- and/or 4,4'-diaminodiphenylmethane or, preferably, diamines containing one alkyl substituent in at least one ortho position to the amino groups (more preferably diamines containing at least one alkyl substituent in a position ortho to the first amino group and two alkyl substituents each containing 1 to 3 carbon atoms in the position ortho to the second amino group, and most preferably diamines containing an ethyl, propyl, and/or isopropyl substituent in at least one position ortho to the amino groups) and, optionally, methyl substituents in other positions ortho to the amino groups. The preferred diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene and technical mixtures thereof with 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, or 3,5-diethyl-3',5'-diisopropyl-4,4'-diaminodiphenylmethane. Mixtures of such aromatic diamines may also be used.

In a particularly preferred embodiment, however, component (b) consists solely of polyols of the type mentioned above which have a molecular weight in the range from 62 to 6,000 and a hydroxyl functionality of 2 to 3.

Component (b) is present in the systems according to the invention in a quantity such that from about 0.1 to about 0.9 (preferably from 0.1 to 0.5) isocyanate-reactive groups of component (b) are present for every isocyanate group of component (a).

Component (c) comprises tertiary amines which preferably contain no isocyanate-reactive groups and have a molecular weight of 101 to 250. Suitable tertiary amines include tertiary amine catalysts known in polyurethane chemistry. Examples of suitable tertiary amines include triethylamine, tributylamine, N-methylmorpholine, N-ethylmorpholine, N-cocomorpholine, N,N,N',N'-tetramethyl ethylenediamine, 1,4-diazabicyclo[2.2.2]octane, N-methyl-N'-(dimethylaminoethyl)piperazine, N,N-dimethylcyclohexylamine, N,N,N',N'-tetramethyl-1,3-butanediamine, 1-cyanoethyl-2-phenyl-imidazol, 1,2-dimethylimidazole, and 2-methylimidazole. A preferred tertiary amine includes N,N-dimethylbenzylamine. Particularly preferred tertiary amines include compounds corresponding to the formulas

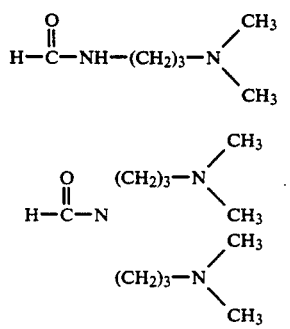

because they are nonvolatile and substantially odorless under the conditions used in the process of the invention.

The tertiary amines (c) are present in the systems according to the invention in a quantity such that the content of tertiary amine nitrogen atoms, including the tertiary amine nitrogen atoms optionally present in component (b), is at least 0.005 mole/100 g (preferably at least 0.01 mole/100 g) of the total quantity of reaction mixture as a whole (that is, the sum of components (a), (b), (c), and (d)). However, even when tertiary amine nitrogen atoms are present in component (b) in a quantity within the range mentioned, the tertiary amines (c) are preferably also used in a quantity such that the content of tertiary amine nitrogen atoms contributed by component (c) to the mixture as a whole is from 0.005 to 0.15 mole/100 g.

The optional auxiliaries and additives (d) include, for example, blowing agents, surfactants, foam stabilizers and internal mold release agents.

Suitable blowing agents include, water, methylene chloride, fluorotrichloromethane. dichlorodifluoromethane, chlorodifluoromethane, and essentially inert gases such as nitrogen, air, and carbon dioxide. Where such inert gases are used, the reaction mixture is "charged" with gas by incorporating the gas in the mixture of components (b), (c), or (d) in a quantity generally at least 10% by volume (preferably in a quantity of at least 20% by volume), based on normal pressure, by means of a Venturi nozzle or a hollow stirrer (as described in German Offenlegungsschrift 3,224,037).

Suitable surfactants are compounds which support the homogenization of the starting materials and include, for example, the sodium salts of fatty acids and salts of fatty acids with amines such as diethylamine oleate or diethanolamine stearate.

Suitable foam stabilizers are preferably water-soluble polyether siloxanes. The structure of these compounds is generally such that a copolymer of ethylene oxide and propylene oxide is attached to a polydimethylsiloxane group. Such foam stabilizers are described, for example, in U.S. Pat. No. 2,764,565.

The quantity of the optional blowing agents, surfactants, and foam stabilizers is generally less than 15% by weight (preferably no more than 10% by weight) based on the total weight of components (a), (b), (c), and (d).

The auxiliaries (d) optionally used also include known internal mold release agents described, for example, in German Offenlegungsschriften 1,953,637 (believed to be equivalent to U.S. Pat. No. 3,726,952), 2,121,670 (believed to be equivalent to British Patent 1,365,215), 2,431,968 (believed to be equivalent to U.S. Pat. No. 4,098,731), and 2,404,310 (believed to be equivalent to U.S. Pat. No. 4,058,492). Preferred mold release agents include the salts (containing at least 25 aliphatic carbon atoms) of fatty acids containing at least 12 aliphatic carbon atoms and primary mono-, di-, or polyamines containing two or more carbon atoms or amines containing amide or ester groups and at least one primary, secondary, or tertiary amino group; saturated and/or unsaturated COOH- and/or OH-group-containing esters of mono- and/or polybasic carboxylic acids and polyfunctional alcohols having hydroxyl or acid values of at least 5; ester-like reaction products of rincinoleic acid and long-chain fatty acids; salts of carboxylic acids and tertiary amines; and natural or synthetic oils, fats, and waxes. Particularly preferred release agents are the oleic acid or tall oil fatty acid salt of the amine containing amide groups which has been obtained by reaction of N-dimethylaminopropylamine with oleic acid or tall oil fatty acid, or the salt of 2 moles of oleic acid and 1 mole 1,4-diazabicyclo[2.2.2]octane.

In addition to the preferred release agents mentioned above, it is also possible in principle in the process of the invention to use other known release agents either individually or in admixture with the preferred release agents mentioned above. These other suitable release agents include, for example, the reaction products of fatty acid esters and polyisocyanates according to German Auslegeschrift 2,307,589, the reaction products of polysiloxanes containing reactive hydrogen atoms with mono- and/or polyisocyanates according to German Offenlegungsschrift 2,356,652 (believed to be equivalent to U.S. Pat. No. 4,033,912), esters of polysiloxanes containing hydroxymethyl groups with mono- and/or polycarboxylic acids according to German Offenlegungsschrift 2,363,452 (believed to be equivalent to U.S. Pat. No. 4,024,090), and salts of polysiloxanes containing amino groups and fatty acids according to German Offenlegungsschrift 2,427,273 or German Offenlegungsschrift 2,431,968 (believed to be equivalent to U.S. Pat. No. 4,098,731).

The internal mold release agents, if used at all, are used in a total quantity of up to 10% by weight (preferably up to 6% by weight) based on the reaction mixture as a whole.

Other additives (d) which may optionally be used include fillers, dyes, pigments, and flameproofing agents.

Examples of suitable fillers, particularly reinforcing fillers, include silicate-containing minerals, for example, layer silicates such as antigorite, serpentine, hornblends, amphibiles, chrysotile, and talcum; metal oxides such as kaolin, aluminum oxides, titanium oxides, and iron oxides; metal salts such as chalk and heavy spar; inorganic pigments such as cadmium sulfide and zinc sulfide; and glass, asbestos powder, and the like. Preferred fillers include natural and synthetic fibrous materials such as asbestos, wollastonite, and, in particular, glass fibers of various lengths that may optionally be sized. Fillers may be used either individually or in admixture. The fillers, if used at all, are advantageously added to the reaction mixture in quantities of up to 50% by weight (preferably in quantities of up to 30% by weight) based on the total weight of components (a), (b), (c), and (d).

Suitable flameproofing agents include tricresyl phosphate, tris(2-chloroethyl) phosphate, tris(chloropropyl) phosphate, and 2,3-dibromopropyl phosphate. In addition to the halogen-substituted phosphates already mentioned, it is also possible to use inorganic flameproofing agents such as aluminum oxide hydrate, ammonium polyphosphate, and calcium sulfate. It is generally best to use up to 25% by weight of the flameproofing agents, based on the sum of components (a), (b), (c), and (d)

The usual auxiliaries and additives are fully discussed in the scientific literature, for example, in *High Polymers*, Vol. XVI, "Polyurethanes, Chemistry and Technology", edited by Saunders and Frisch, Interscience Publishers, New York/London, Vol. I (1962) and Vol. II (1964).

To prepare the reactive systems according to the invention, components (a), (b), (c), and (d) are mixed together at a temperature below about 60° C. (preferably below 40° C.). For slowly reacting mixtures, it is possible to mix all of the individual components by hand and subsequently to cast the resulting mixture. However, in a preferred procedure, the polyisocyanate component (a) is mixed with a previously prepared mixture of polyol component (b) with the amine component (c). The optional auxiliaries and additives (d), if used at all, are added both to component (a) and to the mixture of components (b) and (c) (provided they are compatible with the respective components) or can even be separately added to the mixture.

The reactive systems of the invention obtained as described above have a pot life below 60° C. of up to 120 minutes because the polyurethane-forming reaction, which begins immediately, does not initially lead to hardening and often not even to a significant increase in viscosity, but instead merely leads to an increase in reaction temperature. It is only after the temperature exceeds about 60° C. due to the heat of reaction and/or external heating of the system that the hardening reaction distinctly accelerates as the excess isocyanate groups begin to trimerize. Accordingly, the systems according to the invention are particularly suitable for the production of moldings where comparatively long pot life and casting tine, coupled with a comparatively short in-mold time, are the particularly noteworthy features of the systems.

The reactive systems of the invention may be used according to the process of the invention to form solid or even foamed moldings or castings. Examples of possible applications of the resulting materials include insulating webs for window profiles, rollers, cylinders, cores, cones, filter plates, housings, and pallets. Since very thick walls can be produced without difficulty, the resulting materials are also suitable for the production of thick boards which, in foamed form (density range 400–800 kg/m$^3$) may be used as model making boards.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

In Examples 1 to 9 according to the invention, Component I was a "polyisocyanate component (a)" of the invention prepared by mixing a polyisocyanate-epoxide mixture (Preparation 1 or 2, described below) with another polyisocyanate (Polyisocyanate A, described below). Component II of Examples 1 to 9 according to the invention was a mixture of "components (b) and (c)" of the invention. Components I and II were mixed with a stirrer.

The hardening time for each reaction mixture listed in Table 1 is the time that elapsed before the beginning of hardening in a cardboard cup (diameter 9 cm, height 14 cm, filling 250 g) at the initial temperature shown in Table 1 (i.e., room temperature or 40° C.). The results listed in Table 2 relates to the hardening time of each reaction mixture poured onto a heated metal plate.

In Table 1, Examples 1 to 6 show the effect of different epoxides (monofunctional and difunctional) and different epoxide concentrations.

In Table 2, comparison of the data for Examples 7, 8, and 9 shows the effect of a small quantity of an acidic impurity, dibutyl phosphate. In addition, Comparison Examples 10 and 11, which do not correspond to the invention, show that potlife times roughly comparable with the process of the invention are obtained only with extremely low concentrations of potassium acetate as catalyst (see Example 7 and Comparison Examples 10 and 11 at 50°–70° C.). When potassium acetate is used as catalyst (which does not correspond to the invention), the effect of temperature on reactivity is so large that very stringent demands are placed on controlling the temperature of the reaction mixture. Comparison Example 13 shows that totally inadequate (i.e., excessively short) pot lives result as the concentration of the comparison catalyst potassium acetate is increased.

The crucial advantage of the process according to the invention becomes apparent when Comparison Example 12 is compared with Examples 8 and 9. Even extremely small quantities of the dibutyl phosphorate added as acidic impurity prevent the hardening of mixtures catalyzed with potassium acetate. In contrast, mixtures according to the invention undergo a very much smaller change in reactivity when the acid impurity is present.

Starting materials

Preparation 1:
1000 g carbodiimide-modified 4,4'-diisocyanato diphenylmethane (NCO content 30% by weight)
680 g phenoxypropylene oxide
To the mixture of these components is added 1 g p-toluenesulfonic acid methyl ester. The mixture thus obtained is then heated for 30 minutes at 120° C.
NCO content: 17.0% by weight
Viscosity (25° C.): 19 mPa.s
Preparation 2:
1000 g same carbodiimide-modified diisocyanate as in Preparation 1
680 g diglycidyl ether of bisphenol A
Stabilization is carried out in the same way as for Preparation 1.
NCO content: 17.0% by weight
Viscosity (25° C.): 400 mPa.s
Polyisocyanate A:
Semiprepolymer of 4,4'-diisocyanatodiphenylmethane and tripropylene glycol
NCO content: 23% by weight
Viscosity (25° C.): 700 mPa.s
Polyol 1:
Polyether polyol (OH value 35) prepared by propoxylation of trimethylolpropane and subsequent ethoxylation of the propoxylation product (PO:EO ratio by weight of 82.5:17.5)
Polyol 2:
Polyether polyol (OH value 150) prepared by propoxylation of propylene glycol and subsequent ethoxylation of the propoxylation product (PO:EO ratio by weight of 87:13)

TABLE 1

|  | Examples |  |  |  |  |  |
|---|---|---|---|---|---|---|
|  | 1 | 2 | 3 | 4 | 5 | 6 |
| Component I |  |  |  |  |  |  |
| Polyisocyanate A (parts by wt.) | 115 | 115 | 104 | 115 | 115 | 104 |
| Preparation 1 (parts by wt.) | — | — | — | 20 | 20 | 36 |
| Preparation 2 (parts by wt.) | 20 | 20 | 36 | — | — | — |
| Component II |  |  |  |  |  |  |
| Polyol 1 (parts by wt.) | 100 | 100 | 100 | 100 | 100 | 100 |
| Polyol 2 (parts by wt.) | 10 | 10 | 10 | 10 | 10 | 10 |
| Dimethylbenzylamine (parts by wt.) | 2 | 5 | 5 | 2 | 5 | 5 |
| Hardening Times |  |  |  |  |  |  |
| At RT starting temp. (min.) | 21 | 10 | 8 | 18 | 10 | 8 |
| At 40° C. starting temp. (min.) | 9 | 4 | 4 | 8 | 4 | 4 |

TABLE 2

|  | Example (7–9) | | | Comparison Examples (10–13) | | | |
|---|---|---|---|---|---|---|---|
|  | 7 | 8 | 9 | 10 | 11 | 12 | 13 |
| Component 1 |  |  |  |  |  |  |  |
| Polyisocyanate A (parts by wt.) | 115 | 115 | 115 | 135 | 135 | 135 | 135 |
| Preparation 2 (parts by wt.) | 20 | 20 | 20 | — | — | — | — |
| Dibutyl phosphate (parts by wt.) | — | 0.08 | 0.16 | — | — | 0.08 | — |
| Component 2 |  |  |  |  |  |  |  |
| Polyol 1 (parts by wt.) | 100 | 100 | 100 | 100 | 100 | 100 | 100 |
| Polyol 2 (parts by wt.) | 10 | 10 | 10 | 10 | 10 | 10 | 10 |
| Dimethylbenzylamine (parts by wt.) | 5 | 5 | 5 | — | — | — | — |
| Potassium acetate (parts by wt.) | — | — | — | 0.075 | 0.038 | 0.038 | 0.3 |
| Hardening Times Temperature of the heated plate (°C.) | Time (Min (') Sec (")) | | | | | | |

TABLE 2-continued

| | Example (7–9) | | | Comparison Examples (10–13) | | | |
|---|---|---|---|---|---|---|---|
| | 7 | 8 | 9 | 10 | 11 | 12 | 13 |
| 140 | 50" | 1' | 1'30" | — | — | 12' | — |
| 130 | — | 1'15" | 1'50" | — | — | — | — |
| 120 | 50" | 1'45" | 2' | — | — | 30' | — |
| 110 | — | 2'30" | 2'20" | — | 27" | — | — |
| 100 | 1'15" | 3'10" | 3'20" | 15" | 37" | — | 3" |
| 90 | 2'10" | 4'30" | 5' | 35" | 50" | — | 8" |
| 80 | 3'30" | 7'30" | 7'30" | 50" | 1'10" | — | 12" |
| 70 | 4'30" | 10'30" | 12' | 1'20" | 4'50" | — | 22" |
| 60 | 10' | 16' | 28' | 7'50" | 11'30" | — | 50" |
| 50 | 16' | — | — | 10' | 25' | — | 125" |

What is claimed is:

1. A reactive system comprising
   (a) a storable mixture of
      (i) a polyisocyanate component comprising at least one organic polyisocyanate, and
      (ii) an epoxide component comprising at least one organic epoxide, wherein said epoxide component is stabilized by heating in the presence of an alkylating agent,
   (b) an isocyanate-reactive component comprising at least one organic compound containing at least two isocyanate-reactive groups in a quantity such that 0.1 to 0.9 isocyanate-reactive groups are present for every isocyanate group in component (a), wherein at least 10% by weight of component (b) comprises compounds having a molecular weight greater than about 2000, and
   (c) optionally, a tertiary amine in a quantity such that the storable mixture contains at least 0.005 mole of tertiary amine nitrogen atoms (including any tertiary amine nitrogen atoms present in component (b)) for each 100 g of the total amount of the storable mixture.

2. A reactive system according to claim 1 additionally comprising
   (d) other auxiliaries and additives.

3. A reactive system according to claim 1 wherein the epoxide component (ii) is stabilized by heating in the presence of an alkylating agent and in the further presence of at least part of the polyisocyanate component (i) using quantities of components (i) and (ii) such that 0.005 to 0.15 mole of epoxide groups are present in 100 parts by weight of component (a).

4. A reactive system according to claim 1 wherein the polyisocyanate component (i) is a polyisocyanate or polyisocyanate mixture of the diphenylmethane series that is liquid at room temperature or a liquid derivative of said polyisocyanate or polyisocyanate mixture.

5. A reactive system according to claim 1 wherein the isocyanate-reactive component (b) is a polyhydroxyl compound having a molecular weight in the range from 400 to 12,000 and a hydroxyl functionality of from 2 to 4.

6. A reactive system according to claim 1 comprising
   (a) a storable mixture of
      (i) a polyisocyanate or polyisocyanate mixture of the diphenylmethane series that is liquid at room temperature or a liquid derivative of said polyisocyanate or polyisocyanate mixture, and
      (ii) an epoxide component comprising at least one organic epoxide, wherein said epoxide component is stabilized by heating in the presence of an alkylating agent and in the further presence of at least part of the polyisocyanate component (i) using quantities of components (i) and (ii) such that 0.005 to 0.15 mole of epoxide groups are present in 100 parts by weight of component (a),
   (b) a polyhydroxyl compound having a molecular weight in the range from 400 to 12,000 and a hydroxyl functionality of from 2 to 4 in a quantity such that 0.1 to 0.9 isocyanate-reactive groups are present for every isocyanate group in component (a), wherein at least 10% by weight of component (b) comprises compounds having a molecular weight greater than about 2000,
   (c) a tertiary amine in a quantity such that the storable mixture contains at least 0.005 mole of tertiary amine nitrogen atoms (including any tertiary amine nitrogen atoms present in component (b)) for each 100 g of the total amount of the storable mixture; and
   (d) other auxiliaries and additives.

7. A process for the preparation of optionally foamed polyurethane plastics containing isocyanurate groups comprising
   (1) preparing a reactive system by mixing, optionally in a mold, at a temperature less than about 60° C.,
      (a) a storable mixture of
         (i) a polyisocyanate component comprising at least one organic polyisocyanate, and
         (ii) an epoxide component comprising at least one organic epoxide, wherein said epoxide component is stabilized by heating in the presence of an alkylating agent,
      (b) an isocyanate-reactive component comprising at least one organic compound containing at least two isocyanate-reactive groups in a quantity such that 0.1 to 0.9 isocyanate-reactive groups are present for every isocyanate group in component (a), wherein at least 10% molecular weight greater than about 2000, and
      (c) optionally, a tertiary amine in a quantity such that the storable mixture contains at least 0.005 mole of tertiary amine nitrogen atoms (including any tertiary amine nitrogen atoms present in component (b)) for each 100 g of the total amount of the storable mixture; and
   (2) heating said reactive system to a temperature of at least 60° C. by applying heat and/or by using the heat of the polyurethane-forming reaction.

8. A process according to claim 7 wherein the reactive system additionally comprises
   (d) other auxiliaries and additives.

9. A process according to claim 7 wherein the reactive system is mixed at a temperature less than about 40° C.

10. A process according to claim 7 wherein the epoxide component (ii) is stabilized by heating in the presence of an alkylating agent and in the further presence of at least part of the polyisocyanate component (i) using quantities of components (i) and (ii) such that 0.005 to 0.15 mole of epoxide groups are present in 100 parts by weight of component (a).

11. A process according to claim 7 for the preparation of optionally foamed polyurethane plastics containing isocyanurate groups comprising
(1) preparing a reactive system by mixing in a mold, at a temperature less than about 40° C.,
    (a) a storable mixture of
        (i) a polyisocyanate component comprising at least one organic polyisocyanate, and
        (ii) an epoxide component comprising at least one organic epoxide, wherein said epoxide component is stabilized by heating in the presence of an alkylating agent and in the further presence of at least part of the polyisocyanate component (i) using quantities of components (i) and (ii) such that 0.005 to 0.15 mole of epoxide groups are present in 100 parts by weight of component (a),
    (b) an isocyanate-reactive component comprising at least one organic compound containing at least two isocyanate-reactive groups in a quantity such that 0.1 to 0.9 isocyanate-reactive groups are present for every isocyanate group in component (a), wherein at least 10% by weight of component (b) comprises compounds having a molecular weight greater than about 2000,
    (c) optionally, a tertiary amine in a quantity such that the storable mixture contains at least 0.005 mole of tertiary amine nitrogen atoms (including any tertiary amine nitrogen atoms present in component (b)) for each 100 g of the total amount of the storable mixture, and
    (d) other auxiliaries and additives; and
(2) heating said reactive system to a temperature of at least 60° C. by applying heat and/or by using the heat of the polyurethane-forming reaction.

* * * * *